United States Patent
Brandl

[15] 3,674,204
[45] July 4, 1972

[54] CENTRAL HEATING AND WATER SERVICE SYSTEM

[72] Inventor: Willi Brandl, 12, Schurbungert, 8057 Zurich, Switzerland

[22] Filed: May 26, 1970

[21] Appl. No.: 40,612

[30] Foreign Application Priority Data

May 30, 1969 Switzerland ..........................8276/69

[52] U.S. Cl. ......................................237/8, 237/19, 236/9
[51] Int. Cl. ..............................................................F24d 3/08
[58] Field of Search ...................................................237/7–9

[56] References Cited

UNITED STATES PATENTS

| | | | |
|---|---|---|---|
| 2,322,872 | 6/1943 | Moore | 237/8 R |
| 3,237,608 | 3/1966 | Brandl | 237/8 R X |
| 3,426,971 | 2/1969 | Meier | 237/8 D |
| 2,159,284 | 5/1939 | Miller | 237/8 R |
| 2,162,337 | 6/1939 | Kriechbaum | 237/8 R |

*Primary Examiner*—Edward J. Michael
*Attorney*—Karl F. Ross

[57] ABSTRACT

A system for supplying central-heating water and consumable (service) water in which the heating plant has an evacuated chamber including a storage vessel for the service water and a heating vessel for the central-heating water, both vessels having thermally conductive walls exposed to vapor within the chamber and heated by condensation of vapor thereon. The vapor (e.g. steam) is heated by electrically controlled means (e.g. an electrically operated oil burner) and the control system is designed such that circulation through the heating vessel of the central-heating water is precluded while the storage vessel of the service water is heated and only thereafter is circulation permitted to occur in the central heating network.

4 Claims, 2 Drawing Figures

PATENTED JUL 4 1972          3,674,204

Willi Brandl
Inventor.

By Karl F. Ross
Attorney

CENTRAL HEATING AND WATER SERVICE SYSTEM

FIELD OF THE INVENTION

My present invention relates to a system for supplying central-heating water and consumable (service) water and including a heating plant wherein a boiler is provided to transfer heat to both the service water and the central-heating water. More particularly, the present invention relates to an apparatus for controlling a combined heating boiler for service water and central-heating water.

BACKGROUND OF THE INVENTION

Combination boilers of the above type have been provided heretofore and are customarily used whenever it is desired to supply a central-heating fluid (central-heating water) and service water to an establishment, e.g. domicile, industrial consumer or institutional consumer. Such arrangements generally comprise a boiler beneath a vapor chamber in which a storage vessel is provided for the service water and at least one through-flow system is located through which the central-heating water is passed. The chamber may be evacuated so that water-vapor pressure is at a maximum and boiling occurs from the heated liquid body at a slightly lower pressure than atmospheric. The fluid-vaporization bath, generally a body of water, is usually heated by an electrically controlled means, e.g. a fuel burner, and the vapors rising from the liquid body contact the heat-conductive walls of the service-water storage vessel and the pipe through which the central-heating water flows, to transfer latent heat of condensation to both the service water and central-heating water. In general, the chamber is sealed and the pressure is adjusted such that the temperature at which contact between steam and the service or central-heating water occurs, is sufficient to provide a unidirectional heat transfer to the service water and the central-heating water.

A boiler of this type produces steam in the evacuated space traversed by the central heating water and storing the service water, at a temperature above 20° C, the steam condensing upon the heat-transfer surfaces to transmit heat from the heat source. The heat transfer efficiency depends on the temperature difference between the steam and the condensation surfaces and on the size of the condensation surfaces. Colder surfaces absorb more heat than hotter surfaces and condensation ceases as soon as the temperature of the surfaces exposed to the steam is at least as high as the temperature of the steam. Steam which is cooler than the heating surface, however, has hardly any effect upon the surface and does not materially function as a cooling medium.

In a combined reduced-pressure steam-heated plant of the character described, which is designed for producing hot water for central-heating purposes and hot water for consumption (service water), the service water must generally be heated to a higher temperature (e.g. in the range of 80° to 90° C) than the central-heating water whose minimum temperature may be as low as 40° C, depending upon the space-heating requirements.

Hitherto it has been the practice to provide a connection joining the supply pipe of the central-heating water circuit to the associated vessel in the boiler, e.g. a heating tube, and to form this connection with a mixing valve which bleeds cooler water into excessively heated central-heating water. In order to reduce the temperature of the latter, the central-heating water assuming, during periods of intensive heating of the service water, temperatures as high as that of the latter. Automatic mixing valves of this type have, however, been found to be both expensive and unduly complicated, with a tendency to breakdown or malfunction. Furthermore, since the central-heating water generally has a higher thermal capacity than the smaller volume of service water, it is difficult to overcome the thermal inertia created by the need to heat the body of central-heating water whenever a sudden drain of service water requires preferential heating of the latter.

OBJECTS OF THE INVENTION

It is a general object of this invention to obviate the disadvantages mentioned above and provide a heating boiler of the character set forth with control apparatus which, using simple means, enables the central-heating water and service-water to be heated to mutually independent temperatures with heating of the service water having precedence in time.

It is another object of the invention to provide an improved system controlling a boiler designed to provide both service water and central-heating water wherein the thermal inertia of the larger overall volume of the central-heating water is excluded and a preferential heating of the service water is assured.

It is another object of this invention to provide a system for controlling a low-pressure boiler of the character described which permits regulation of the temperature of the central-heating water without complex and expensive mixing valves.

A further object of the invention is to provide a control system for a boiler of the class described which does not require expensive and complicated mixing valves but which nevertheless preferentially supplies heated service water and allows control of the temperature of the central-heating water.

SUMMARY OF THE INVENTION

These objects and others which will become apparent hereinafter, are attained, in accordance with the present invention, in an apparatus for controlling a combined heating boiler with provision for supplying service water as well as central-heating water, the boiler comprising a storage vessel for the service water and at least one throughflow vessel for the central-heating water in a sealed space from which air has been evacuated above a fluid-vaporization bath which can be heated by means of an electrically controlled heat source; the apparatus of the invention includes an adjustable storage-vessel thermostat in the form of a changeover switch having one switch position in which a control connection in the heat source is directly connected to a feed-current (electrical-current supply) source and another switch position in which the control connection is connected to the feed-current source through a boiler thermostat which can be set at a lower temperature. In this other switch position of the storage-vessel thermostat, an electrically operable shutoff element for the central-heating water is connected through a further thermostat in such manner that the heat source is either continuously switched on as long as the service-water temperature is below the temperature set at the storage vessel thermostat, or is switched on according to the lower temperature set at the boiler thermostat when the service-water temperature equals the temperature set at the storage vessel thermostat. The shutoff element opens or closes a passage for the central-heating water according to the temperature set at the further thermostat.

In its method aspects, therefore, the invention comprises operating a heating plant for supplying central-heating water to a circulation network (for central heating of room spaces by radiators or the like) and heated service water to at least one consumer, the method comprising storing a body of the service water in an evacuated chamber and passing central-heating water through this chamber in heat-exchanging relationship with a vapor thereon; vaporizing a liquid in this chamber to produce the vapor by heating the liquid; and restricting the flow of central-heating water through said chamber during the heating of the liquid at least until the temperature of the body of service water reached a predetermined level.

According to the invention, the flow of central-heating water through the chamber is also restricted until the pressure in the chamber reaches a predetermined level. The heating of the liquid of the body which produces the vapor is preferably effected by combustion of a fuel under electrical control, the fuel being gas or fuel oil, as may be convenient.

Hence the heating plant according to the invention comprises, in combination with an evacuated chamber, electrically controlled means for heating a body of liquid to generate a heating vapor in this chamber, means for retaining a body of service water in this chamber in heat-exchanging relationship with the vapor, and means for passing central heating water through this chamber in heat-exchanging relationship with the vapor therein, of control means for energizing the heating means while restricting the flow of central-heating water until the body of service water reaches a predetermined level.

The control means comprises a service-water thermostat responsive to the temperature of the body of service water and having a switch with a first switch position energizing the electrically controlled means to heat the body of liquid, and a second switch position, a boiler thermostat responsive to the temperature of the switch of the service-water thermostat to energize the electrically controlled means upon the temperature in the body of liquid falling below a predetermined level in the second position of the switch of the service-water thermostat, and means effective in the first position of the latter switch for restricting the flow of central-heating water.

The central-heating water flow may be controlled by a pump, via a relay whose coil or winding is connected in circuit with the changeover switch of the service-water or storage-vessel thermostat, and contacts control by the relay which operates the pump motor. An equivalent construction makes use of a control valve of the electromagnetic type whose winding is connected in the aforementioned circuit with the switch of the service-water thermostat or lies in circuit with a relay connected as described.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
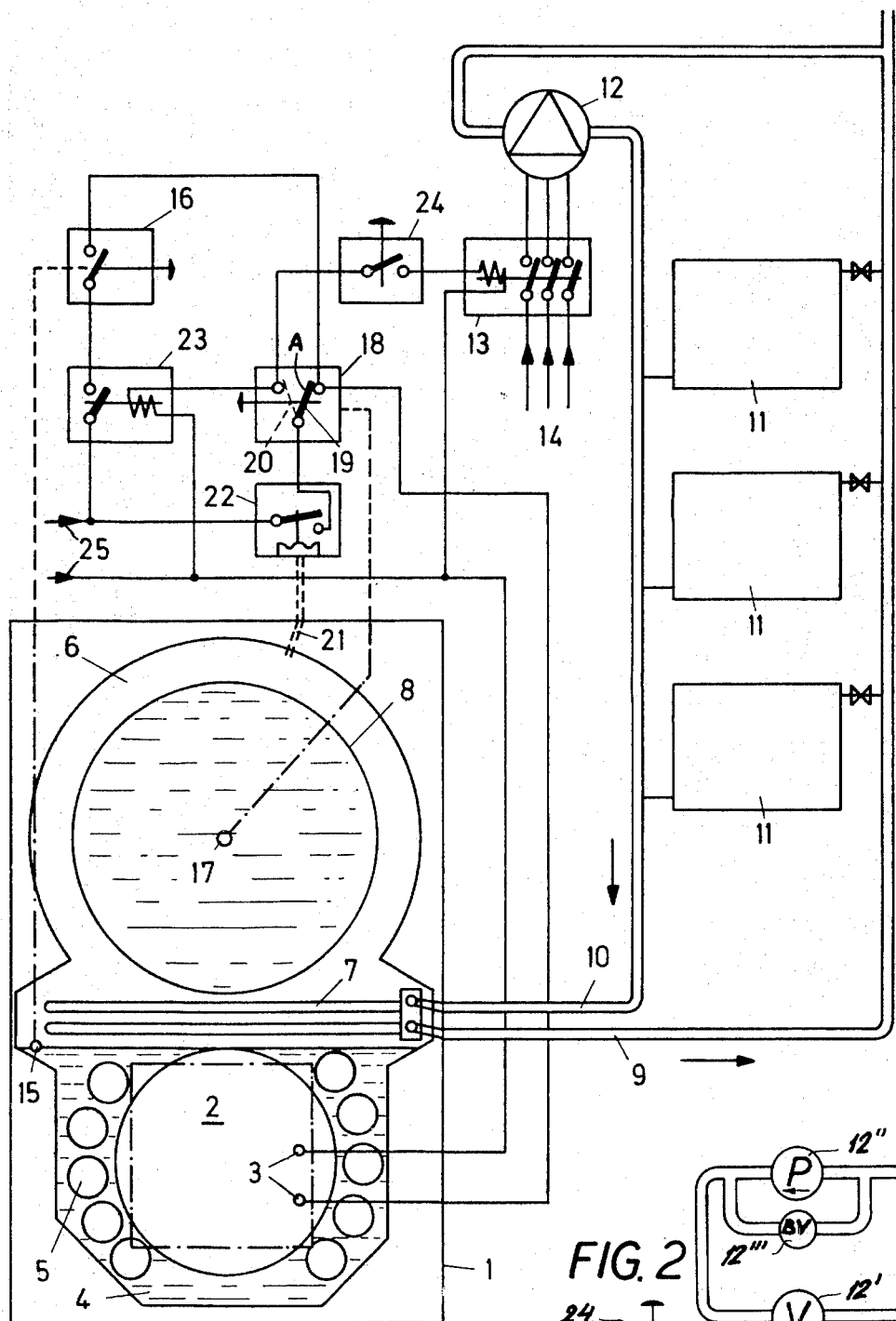
FIG. 1 is a diagram representing a vertical cross-section through the boiler schematically illustrating the control means and fluid networks associated with the heating plant.
Figure 2:
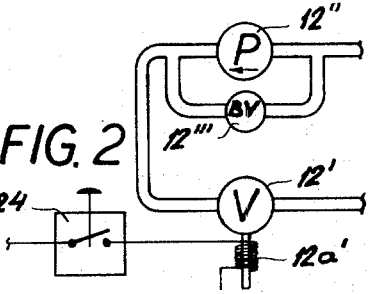
FIG. 2 is a diagram of a portion of FIG. 1 showing an alternative construction.

The lower portion of a boiler 1 contains a burner (combustion chamber) 2, e.g. gas or oil burner, having electrical control terminals 3. The burner 2 is operated by supplying current to the terminals 3. The burner is surrounded by a fluid bath 4, e.g. a water bath. Waste-gas tube 5 provides additional heating for the fluid bath 4.

Above the level of the fluid bath 4 there is a sealed space 6, from which the air is evacuated and which is sealed off from the atmosphere in a fluid-tight manner. This space 6 contains, above the fluid bath 4, a heating tube 7, provided as the vessel for the central-heating water in a central heating system, and above this heating tube a storage tank 8 containing the service water. The conventional central heating system connected to the heating tube 7 has a supply pipe 9 and a return pipe 10, between which there are a plurality of radiators 11. The central-heating water circuit also contains an electric pump 12 (FIG. 1). Alternatively, a valve 12' can be substituted for the pump 12 to enable the heating water circuit to be interrupted. A pump contactor 13 connects the pump 12 to a three-phase mains 14. When valve 12' is used, it is normally closed so that pump 12'' drives through bypass valve 12''' until the coil 12a' of valve 12' is energized through thermostat 24.

In the fluid bath 4 there is a first temperature sensor 15 operatively connected to an adjustable boiler thermostat 16. A further temperature sensor 17 in the storage tank containing the service water is operatively connected to a storage-tank thermostat 18, in the form of a change-over switch whose movable contact A as two switch positions 19 and 20. The evacuated steam space 6 communicates by way of a tube 21 with a pressostat or maximum control 22, which monitors the evolution of the final pressure in the space 6 and changes over at a permanently set pressure of 0.7 to 1 atmospheres absolute. Further switching means are a bypass contactor 23 and an adjustable room, outside or supply-pipe thermostat 24. Electricity is supplied to the burner 2 and contactors 13, 23 along a single-phase mains connection 25.

The present, illustrated apparatus has three electrical control circuits:

A first control circuit runs from one pole of the mains connection 25 by way of the normally closed contact of the pressostat 22, the storage-tank thermostat 18 (which is in the switch position 19 shown by solid lines) and the terminals 3 of the burner 2 to the other pole of the mains connection 25.

When the storage-tank thermostat 18 is in its second switch position 20 (shown by broken lines), a second control circuit runs from one pole of the mains connection 25 through the pressostat 22 and storage-tank thermostat 18 to the energizing winding of the bypass contactor 23 and through this to the other pole of the main connection 25. After the resulting energization of the bypass contactor 23, the burner 2 with its terminals 3 is connected to the mains connection 25 by way of the boiler thermostat 16.

When the storage-tank thermostat 18 is in switch position 20, a third control circuit runs parallel to the second control circuit from one pole of the mains connection 25 through the pressostat 22, storage-tank thermostat 18 and room, outside or supply-pipe thermostat 24 to the energizing winding of the pump contactor 13, and through this to the other pole of the mains connection 25. When the room thermostat 24 is on, therefore, the pump contactor 13 is operated and the pump 12 is connected to the three-phase mains 14.

As long as the temperature of the service water in the storage tank 8 is below the temperature set in the storage-tank thermostat 18, e.g. below 85°, the storage-tank thermostat 18 is in switch position 19. Since, under normal operating conditions, the pressostat 22 is closed, the burner 2 is connected to the mains connection 25, so that it rapidly vaporizes the fluid bath, heating the surface water by way of the saturated steam condensing on the outside surface of the storage tank 8 in the under-pressure area. Since the pump 12 is not operating (or any valve substituted for it is closed), the steam generated must first heat only the stationary central-heating water in the heating tube 7.

As soon as the service water in the storage tank 8 reaches the preset temperature of 85° C, which occurs within a few minutes even if the service water was initially cold, the storage-tank thermostat moves into its other switch position 20. The burner 2 is now connected to the mains connection 25, when the boiler thermostat 16 is switched on. The boiler thermostat can be set at a temperature within the range from approximately 40° to 90° C, e.g. at 50° C. The internal boiler temperature therefore drops after the previous heating of the storage tank 8 and is kept substantially constant of the level set, by switching the burner 2 on and off. The cooler steam now present cools the storage tank only to a negligible extent, however, and on the other hand the steam insulates the storage tank from losing heat to the exterior.

If the room, outside or supply-pipe thermostat 24 now changes over, the pump 12 is started by way of the pump contactor 13, so that the central-heating water circuit with the supply pipe 9, radiators 11 and return pipe 10 is cut in and the water in the supply pipe 9 reaches the temperature set at the boiler thermostat 16, e.g. 50° C. The central-heating water circuit is cut out again when the room, outside or supply-pipe thermostat 24 switches off.

If, due to hot water being drawn off or the loss of heat by radiation, the temperature of the service water in the storage tank 8 drops by more than the switching temperature difference in the storage-tank thermostat 18, the latter moves into switch position 19. The storage tank 8 is then heated again, the third control circuit with the room thermostat 24 and pump contactor 13 being interrupted, so that the central-heating water circuit is blocked even if the room thermostat 24 is still on. Since, when the storage-tank thermostat 18 is in switch position 19, the boiler thermostat 16 is bypassed, the storage tank 8 can be heated to the preset temperature, e.g. 85° C, even if the supply-pipe temperature has been set substantially lower, e.g. at 50° C, by means of the boiler thermostat 16. During both heating and reheating, therefore, the storage tank 8 always has precedence over the central-heating water circuit and is always heated to the final temperature set. Since the service water in the tank 8 is heated within a few minutes, this brief blocking of the central-heating water circuit cannot cause an appreciable temperature drop in the rooms heated. On the other hand, the heating tube 7 contains only a little water, which, when it has been brought to a higher temperature due to heating of the storage tank, passes into the pipes without causing an appreciable temperature rise in the radiator 11.

The apparatus described has the advantages of permitting heating of the service water and central-heating water to mutually independent temperatures which can be set as desired, and of heating the service water automatically and without appreciable adverse effect on the delivery of heat through the central-heating water circuit. Moreover, the apparatus described is simple in construction, reliable in operation and inexpensive to manufacture. Most of the switching means described are already present in any installation, the only additional switching means being the storage-tank thermostat 18 (with a change-over contact instead of the usual rest contact) and the bypass contactor 23.

I claim:

1. A central heating and service water system, comprising:

a boiler including duct means for central-heating recirculated water, a storage vessel for service water, and electrically controlled heating means for heating said duct means and said vessel;

means forming a recirculating path for central-heating water and including said duct means for space heating remote from said boiler, said means forming said path including an electrically controlled flow-control means;

a first thermostat responsive to the temperature of water in said vessel;

a second thermostat responsive to the temperature generated by said heating means;

a third thermostat responsive to a temperature independent of said boiler and connected in series with said flow-control means, said first thermostat being provided with a changeover switch having a first position connecting said heating means directly with an electric-current supply and cutting off said second thermostat, said third thermostat and said flow control means; and circuit means connected with said first thermostat in a second position thereof for connecting said third thermostat and said flow control means in series with said supply to unblock said flow control means upon a temperature fall sensed by said third thermostat whereby said third thermostat controls the operation of said flow control means, said heating means and said second thermostat being connected to said supply in said second position whereby said second thermostat controls the temperature generated by said heating means.

2. The system defined in claim 1 wherein said third thermostat is positioned to respond to the temperature of a space heated by the water circulated along said path.

3. The system defined in claim 1 wherein said heating means includes a combustion chamber, an electrically controlled device for generating combustion in said chamber and a body of water surrounding said chamber below said duct means, said second thermostat being responsive to the temperature of said body of water.

4. The system defined in claim 3 wherein the last-mentioned device is a fuel burner.

* * * * *